(12) United States Patent
Guo et al.

(10) Patent No.: US 9,057,795 B2
(45) Date of Patent: Jun. 16, 2015

(54) AZIMUTHAL CEMENT DENSITY IMAGE MEASUREMENTS

(71) Applicants: Pingjun Guo, Bellaire, TX (US); Richard J. Smith, Calgary (CA); Thomas J. Boone, Calgary (CA)

(72) Inventors: Pingjun Guo, Bellaire, TX (US); Richard J. Smith, Calgary (CA); Thomas J. Boone, Calgary (CA)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 14/278,143

(22) Filed: May 15, 2014

(65) Prior Publication Data

US 2014/0374582 A1 Dec. 25, 2014

Related U.S. Application Data

(60) Provisional application No. 61/838,072, filed on Jun. 21, 2013.

(51) Int. Cl.
*G01V 5/12* (2006.01)
*E21B 47/00* (2012.01)

(52) U.S. Cl.
CPC ............ *G01V 5/125* (2013.01); *E21B 47/0005* (2013.01)

(58) Field of Classification Search
CPC .............................. G01V 5/101; G01V 5/105
USPC ............................................ 250/269.1–269.8
See application file for complete search history.

(56) References Cited

U.S. PATENT DOCUMENTS

| | | | |
|---|---|---|---|
| 3,815,677 A | 6/1974 | Pennebaker, Jr. | |
| 4,129,777 A * | 12/1978 | Wahl et al. ..................... | 250/264 |
| 5,077,697 A | 12/1991 | Chang | |
| 5,627,368 A | 5/1997 | Moake | |
| 5,659,135 A | 8/1997 | Cacas | |
| 5,675,147 A | 10/1997 | Ekstrom et al. | |
| 5,828,981 A | 10/1998 | Callender et al. | |
| 5,869,755 A | 2/1999 | Ramamoorthy et al. | |
| 6,061,300 A | 5/2000 | Yamamoto | |
| 6,088,656 A | 7/2000 | Ramakrishnan et al. | |
| 6,091,669 A | 7/2000 | Chen | |
| 6,289,284 B1 | 9/2001 | Yamamoto | |
| 6,307,199 B1 * | 10/2001 | Edwards et al. .......... | 250/269.3 |
| 6,374,185 B1 | 4/2002 | Taner et al. | |
| 6,470,274 B1 | 10/2002 | Mollison et al. | |
| 6,473,696 B1 | 10/2002 | Onyia et al. | |
| 6,493,632 B1 | 12/2002 | Mollison et al. | |
| 6,529,833 B2 | 3/2003 | Fanini et al. | |
| 6,674,432 B2 | 1/2004 | Kennon et al. | |
| 6,711,502 B2 | 3/2004 | Mollison et al. | |
| 6,715,551 B2 | 4/2004 | Curtis et al. | |
| 6,718,265 B2 | 4/2004 | Herron et al. | |
| 6,751,558 B2 | 6/2004 | Huffman et al. | |
| 6,781,115 B2 | 8/2004 | Stoller et al. | |
| 6,795,773 B2 | 9/2004 | Soliman et al. | |
| 6,904,365 B2 | 6/2005 | Bratton et al. | |
| 6,941,255 B2 | 9/2005 | Kennon et al. | |
| 6,959,246 B2 | 10/2005 | Herron | |
| 6,977,866 B2 | 12/2005 | Huffman et al. | |

(Continued)

*Primary Examiner* — Kiho Kim
(74) *Attorney, Agent, or Firm* — ExxonMobil Upstream Research Company Law Dept.

(57) ABSTRACT

Well logging method and logging tool for measuring cement density and thickness at different azimuth angles for a cemented, cased well. The method uses a gamma source, a short-spaced detector, a long-spaced detector, and preferably a backscatter detector, where the detector-to-source spacings are designed for calculating (93) thickness and density of the cement annulus (94) from the detector count rates (91).

22 Claims, 7 Drawing Sheets

(56) References Cited

U.S. PATENT DOCUMENTS

| | | |
|---|---|---|
| 6,987,385 B2 | 1/2006 | Akkurt et al. |
| 7,006,951 B2 | 2/2006 | Pond, Jr. et al. |
| 7,027,964 B2 | 4/2006 | Kennon |
| 7,043,413 B2 | 5/2006 | Ward et al. |
| 7,111,681 B2 | 9/2006 | Detournay et al. |
| 7,149,671 B2 | 12/2006 | Lim et al. |
| 7,257,490 B2 | 8/2007 | Georgi et al. |
| 7,260,508 B2 | 8/2007 | Lim et al. |
| 7,277,795 B2 | 10/2007 | Boitnott |
| 7,286,939 B2 | 10/2007 | Bachrach et al. |
| 7,356,413 B2 | 4/2008 | Georgi et al. |
| 7,363,161 B2 | 4/2008 | Georgi et al. |
| 7,369,973 B2 | 5/2008 | Kennon et al. |
| 7,377,318 B2 | 5/2008 | Detournay et al. |
| 7,472,588 B2 | 1/2009 | Slavin et al. |
| 7,516,016 B2 | 4/2009 | DeMartini et al. |
| 7,825,659 B2 | 11/2010 | Georgi et al. |
| 7,859,943 B2 | 12/2010 | Herwanger |
| 8,072,840 B2 | 12/2011 | Akhtar |
| 8,090,555 B2 | 1/2012 | Dai et al. |
| 8,195,399 B2 | 6/2012 | Gladkikh et al. |
| 8,612,194 B2 | 12/2013 | Horne et al. |
| 2002/0067373 A1 | 6/2002 | Roe et al. |
| 2004/0210393 A1* | 10/2004 | Ellis et al. .......... 702/8 |
| 2005/0017602 A1* | 1/2005 | Arms et al. .......... 310/339 |
| 2006/0025976 A1 | 2/2006 | Kennon et al. |
| 2006/0219402 A1 | 10/2006 | Lecampion |
| 2008/0061225 A1 | 3/2008 | Orban et al. |
| 2008/0136562 A1* | 6/2008 | Kulah et al. .......... 333/186 |
| 2010/0072380 A1* | 3/2010 | Britton et al. .......... 250/370.07 |
| 2011/0248846 A1* | 10/2011 | Belov et al. .......... 340/539.1 |
| 2011/0253364 A1 | 10/2011 | Mosse et al. |
| 2011/0285146 A1* | 11/2011 | Kozinsky et al. .......... 290/1 R |
| 2012/0017978 A1* | 1/2012 | Doraiswami et al. .......... 136/256 |
| 2012/0075953 A1 | 3/2012 | Chace et al. |
| 2012/0256492 A1* | 10/2012 | Song et al. .......... 307/66 |
| 2013/0270431 A1* | 10/2013 | Minette et al. .......... 250/269.3 |
| 2013/0328416 A1* | 12/2013 | Whitworth et al. .......... 307/149 |

* cited by examiner

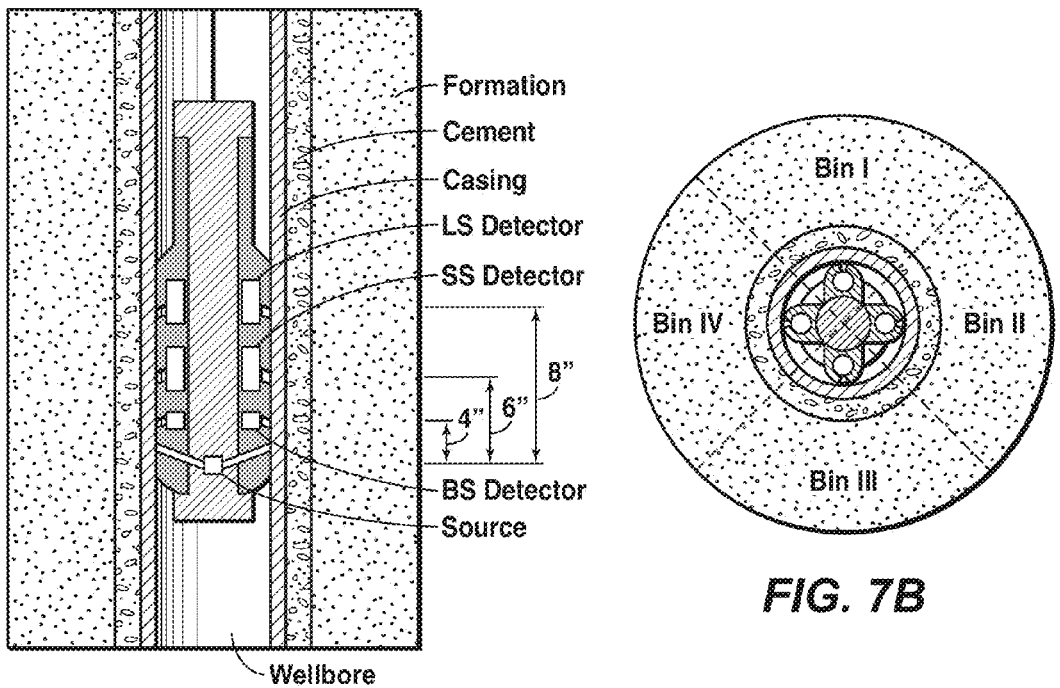
FIG. 7A
FIG. 7B
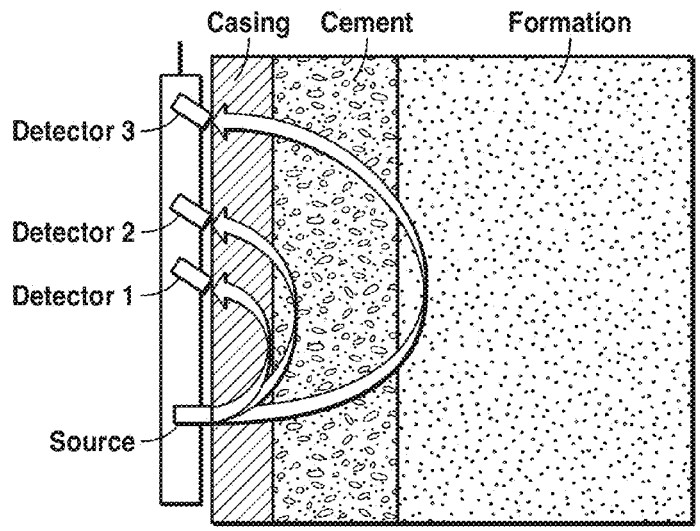
FIG. 8

AZIMUTHAL CEMENT DENSITY IMAGE MEASUREMENTS

CROSS-REFERENCE TO RELATED APPLICATION

This application claims the benefit of U.S. Provisional Patent Application 61/838,072, filed Jun. 21, 2013, entitled Azimuthal Cement Density Image Measurements, the entirety of which is incorporated by reference herein.

FIELD OF THE INVENTION

This invention relates generally to the field of production of oil or gas, and more particularly to well drilling. Specifically, the invention is a method for evaluating cement density as a function of azimuth angle around well casings.

BACKGROUND OF THE INVENTION

When a well is drilled and steel casing is placed, cement slurry is pumped into the annular space between casing and formations. The primary objectives of cementing are to provide mechanical support for the steel casing string and zonal isolation between earth strata or formations. Multiple-stage casing and cementing operations are common procedures to establish pressure barriers during drilling a well. It allows the use of heavier drilling muds in drilling deeper sections without damaging or fracturing the shallower formations due to hydrostatic pressure gradient. An ideal cementing job would fill the casing and formation annulus completely with cement. Potential issues encountered in cementing operations are fluid filled channels within the cement sheath and fluid contaminated cement due to incomplete replacement or sweep of drilling mud with cement slurry. Zonal isolation assessment is a critical aspect of well integrity tests to ensure hydrocarbon production in a safe manner. Cement evaluation measurements are relied upon to demonstrate fluid cross flow is not expected from unwanted zones, i.e. zones other than the producing intervals. This invention relates to in situ evaluation of cement quality between steel casing and formations in a wellbore.

Gamma ray density logging technology is a well-known art to provide formation density and porosity data in petrophysical analysis and formation evaluation. A nuclear density log provides volumetric density measurements of the wellbore and surrounding media. In theory, a nuclear density tool may be constructed with a gamma ray source and one gamma ray detector. The bulk density response in a homogeneous and infinite medium is calibrated as a function of detector count rates. The calibration is normally performed in rock standards with known density value in laboratories. A unique calibration converting count rates to density values is assigned to every density logging tool. Density tools, in practice, have multiple detectors in place in order to provide accurate density measurements in layered media, such as mud cake, casing, and cement.

Existing density tools are designed to optimize sensitivity to the density in the formation rather than the density in the mud cake, casing, or cement. Interpretation methods are devised to remove mud cake, standoff, casing and cement effects as unwanted environmental effects. Shown in FIG. 1 is the traditional "spine-and-ribs" response plot of a two-detector density tool to remove the mud cake effect in an open hole. (Figure from Ellis and Springer, *Well Logging for Earth Scientists*, Springer (2007)) Mud cakes are solid and fine filtrates in drilling mud accumulated on the wellbore wall as a result of fluid loss to the porous rocks. The two-detector based spine-and-ribs method allows the accurate interpretation of formation density in the presence of a mud cake layer or standoff. The mud cake density is typically lower than formation density. When heavy muds such as barite mud are used, mud cake density value is greater than formation density. Interpretation algorithms using spine-and-ribs schemes are capable of producing formation rock density by correcting the mud and standoff effects. Existing density tools are seldom used in wells that are completed with casing and cement and are not capable of providing accurate formation density measurements in those circumstances. This is because the spine-and-ribs method does not remove the large casing and cement effects. These tools and the associated algorithms are not capable of accurately measuring cement properties in cased wells as these tools are not optimized to measure material properties other than mud cake.

To use FIG. 1, the count rate from a detector located close to the source (short-spaced detector) is plotted against the count rate from a detector located farther from the source (long-spaced detector). FIG. 1 then gives a correction to compensate the measured formation density for the effects of the mud cake. If there is no mud cake present between the logging tool and borehole wall, the short and long-spaced detector response would follow the primary response curve called the spine line. If there is mud cake, the detector response would follow one of the departure lines or rib lines depending upon the mud cake properties. The formation density is the long-spaced detector density plus the density correction which equals to density difference along the rib lines.

There are primarily two types of gamma ray density tools. Shown in FIG. 2 is a schematic of a typical wireline density tool which is used to acquire formation density data after a well is drilled. The typical tool configuration consists of a gamma ray source, a long-spaced detector located at approximately 16 inches from the source, a short-spaced detector located at approximately 8 inches from the source, and an optional backscatter detector at about 4 inches from the source. The back scatter measurement allows a correction to be made for borehole size irregularities such as rugosity and washouts. These detector-to-source spacing values are optimized to maximize the measurement sensitivity to the formation density and minimize the near-borehole effects due to the presence of mud cake and casing/cement. In another words, the detectors are placed at larger distances from the source, so that the mud cake, casing and cement investigation volumes account for a small portion of the total investigation volume. The tool diagrammed in FIG. 2 has one gamma ray source and two or three gamma ray detectors. The interpretation algorithms are built on spine-and-ribs based methods:

$$\rho_b = \rho_{LS} + \Delta\rho$$

Where $\rho_b$ is formation density, $\rho_{LS}$ is long-spaced density density, and $\Delta\rho$ is the mud cake density correction which is a function of long-spaced and shorted spaced density measurements:

$$\Delta\rho = f(\rho_{LS}, \rho_{SS})$$

where $\rho_{LS}$ and $\rho_{SS}$ are long-spaced and short-spaced densities.

It is most commonly run in open holes before steel casing and cement are placed in a wellbore. However, it is also used occasionally to log cased wells to acquire formation density logs, with much reduced data precision and accuracy.

Shown in FIG. 4 is a schematic diagram of a typical logging-while-drilling (LWD) density tool which is used to acquire formation density data while a well is being drilled.

The LWD tool module is mounted on the drill pipe and is operated above the bottom-hole-assembly (BHA). When a well is drilled, a rotating BHA enables the LWD density tool to record azimuthal density image data. The LWD tool is integrated with the BHA and is not designed for cased wells density logging. A density image example is shown on the left track in FIG. 3. The right track shows a density log made by a wireline tool with no azimuthal dependency.

Following is a partial list of publications on density logging techniques.

U.S. Pat. No. 3,815,677 ("Method for operating in wells") describes running an open hole sonic log and a cased hole neutron log to detect fluid channels in cement. Azimuthally oriented nuclear density logs are also run to detect fluid-filled channels. The oriented density scan is plotted and the density variations in the plot provide indications of channels in the cement. The disclosed method of fluid-filled channel detection is qualitative in nature.

U.S. Pat. No. 5,627,368 to Moake ("Four-detector formation-density tool for use in cased and open holes") discloses a nuclear density tool design with four detectors to provide measurements of casing and cement weight and thickness as well as formation density. It teaches a method for measuring the thickness of the cement, and a method for measuring the density of the cement. There is no disclosure of a tool design with azimuthal capability for measurement around the wellbore to generate cement density and thickness maps.

U.S. Pat. No. 6,781,115 ("Subsurface radiation phenomena detection with combined and azimuthally sensitive detectors") discloses a nuclear tool design with a detector system that has azimuthal sensitivity by placing multiple detectors at different azimuths. Unlike the present invention, these detectors are not placed on articulated pads to accommodate varying casing size.

U.S. Patent Application Publication No. 2008/0061225, "Logging tool for determination of formation density (Embodiments)," by Orban et al., discloses a logging tool design with one or more detectors and a rotating source. Azimuthal formation density measurements are provided by, for example, collimated shielding placed around the rotating source. The multiple sensor pad configuration of FIG. 13 generates images with gaps. A rotating source and detector configuration to provide continuous borehole scan is not disclosed.

Patent application publication WO 2011/152924, "System and method for generating density in a cased-hole," describes a method and device for cased hole density logging. The objective is to find formation density, and interpretation algorithms are disclosed for doing that, and for making corrections for the effects of casing and cement. No disclosures are made regarding azimuthal measurements.

Commercially available logging tools/products offered by oil service companies include:
Cased Hole Analysis Tools (CHAT) by Voltage Wireline Inc., and the Three detector Litho-Density tool (TLD) by Schlumberger. With adaptations as taught by the present disclosure, these tools could provide qualitative cement density and thickness measurements, but their design objectives are for formation rock density measurements and not for accurate measurements of cement properties. Nor do they have azimuthal sensitivity to scan the wellbore.

SUMMARY OF THE INVENTION

In one embodiment, the invention is a method for generating a cement density image in a cemented borehole, comprising positioning a logging tool inside the borehole at a selected depth, wherein the logging tool comprises a gamma ray source, a short-spaced detector positioned ≤7 inches from the source, and a long-spaced detector positioned less than 12 inches but farther than the short-spaced detector from the source; and measuring gamma ray count rates at each detector and using them to calculate an estimated cement thickness or density.

In another embodiment, the invention is a nuclear density logging tool for cemented borehole use, for estimating cement density or thickness, comprising a tool body adapted to be lowered longitudinally into a casing in a cylindrical borehole along the borehole axis, said tool body housing a gamma ray source, a short-spaced detector and a long-spaced detector, all fixed to the tool body and spaced in the longitudinal direction such that the short-spaced detector is positioned ≤7 inches from the source and the long-spaced detector is positioned less than 12 inches from the source but farther than the short-spaced detector.

BRIEF DESCRIPTION OF THE DRAWINGS

The present invention will be better understood by referring to the following detailed description and the attached drawings in which:

FIGS. 7A and 7B are schematic diagrams showing a side view and a cross-sectional view of a wireline cement density tool design of one embodiment of the present invention, with multiple measurement pads; the distances are measured between centers of the gamma ray source and the detectors;

FIG. 8 illustrates the volumes of investigation for each detector of a three-detector cement density tool with source-to-detector distances optimized according to the present inventive method.

Figure 1:
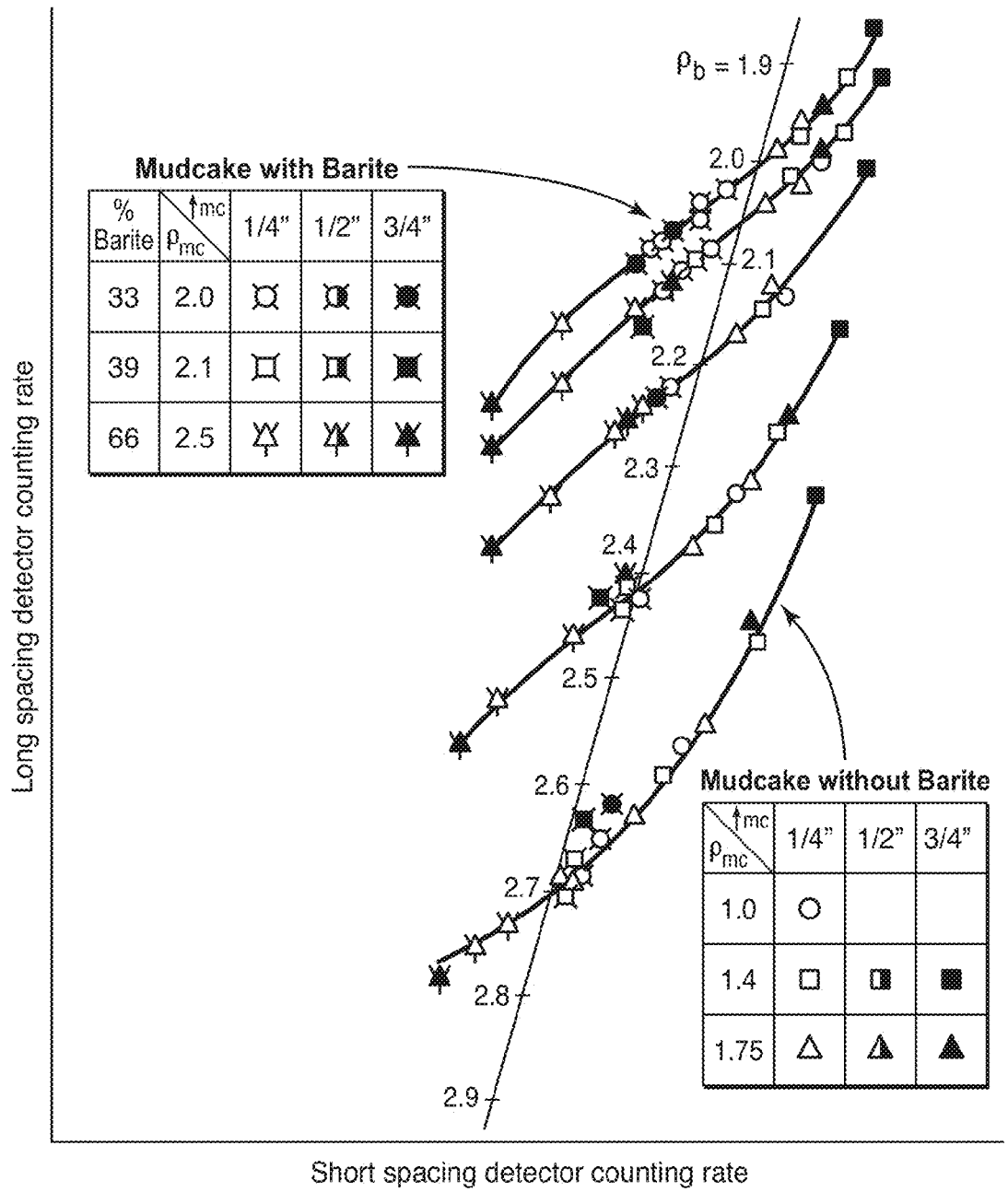
FIG. 1 illustrates a spine-and-ribs response plot of a two-detector density tool (Ellis, 2007)
Figure 2:
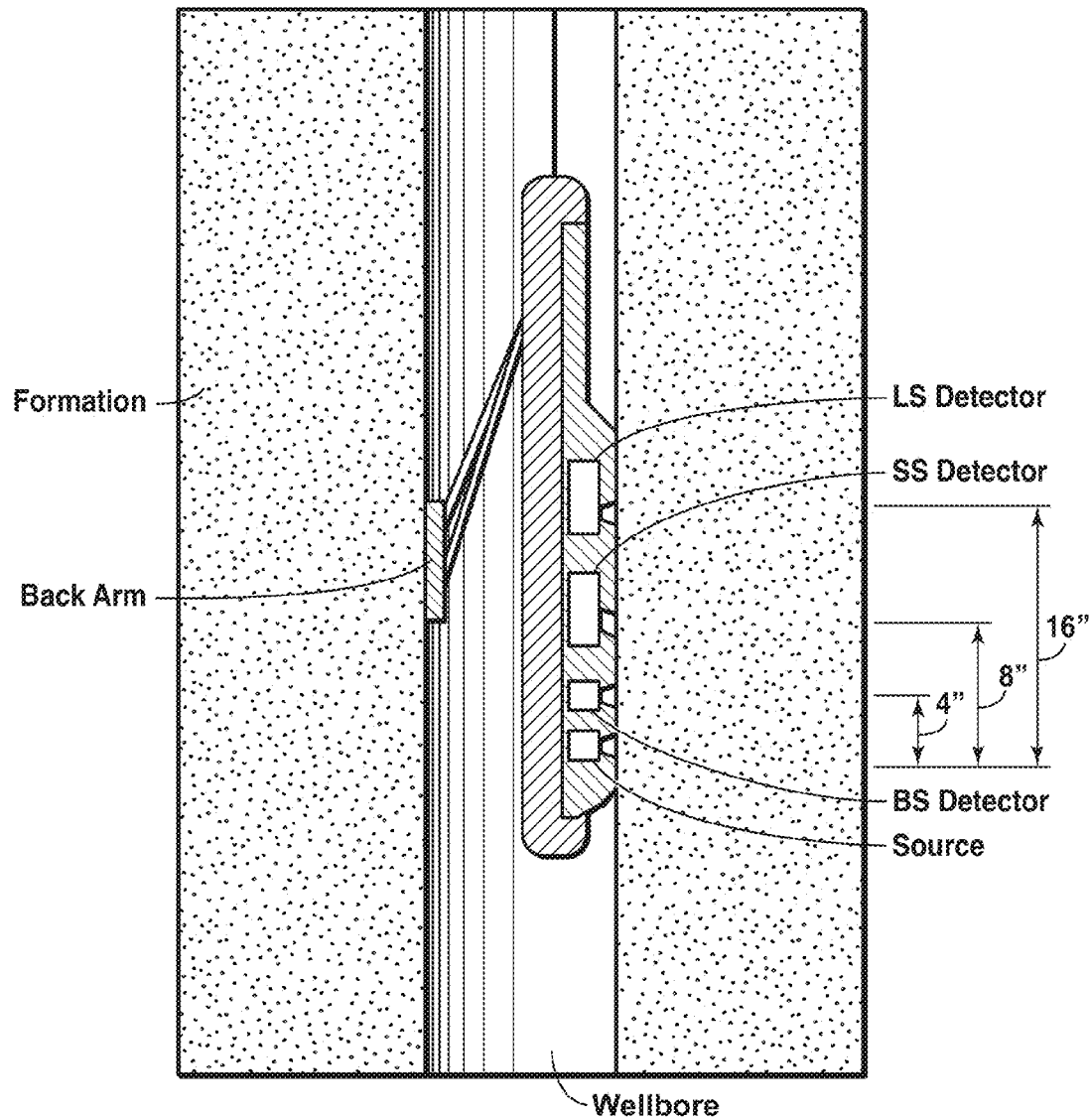
FIG. 2 is a schematic diagram illustrating a typical wireline density tool with three detectors; the distances are measured between centers of the gamma ray source and the detectors and are typical values for existing technology.
Figure 3:
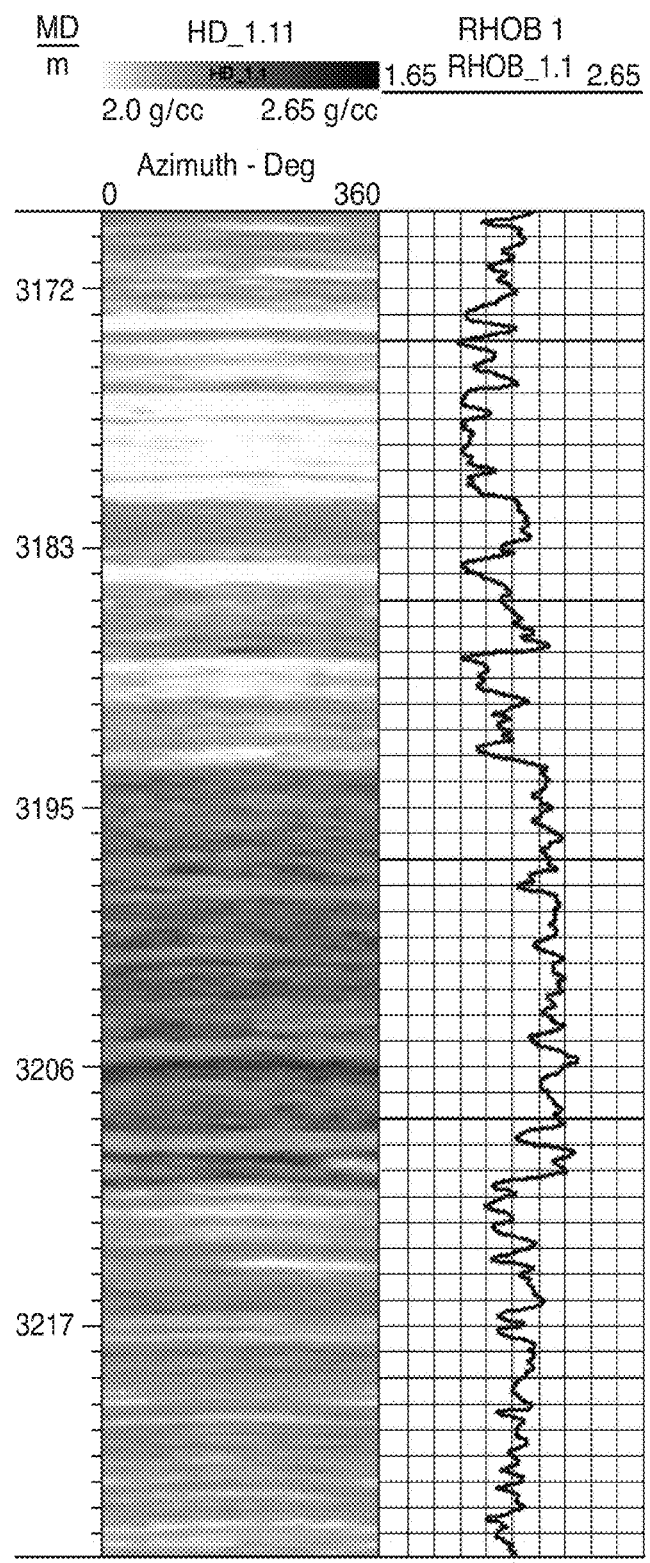
FIG. 3 shows an example of a LWD density image log (left track) and a wireline scalar density log (right track)
Figure 4:
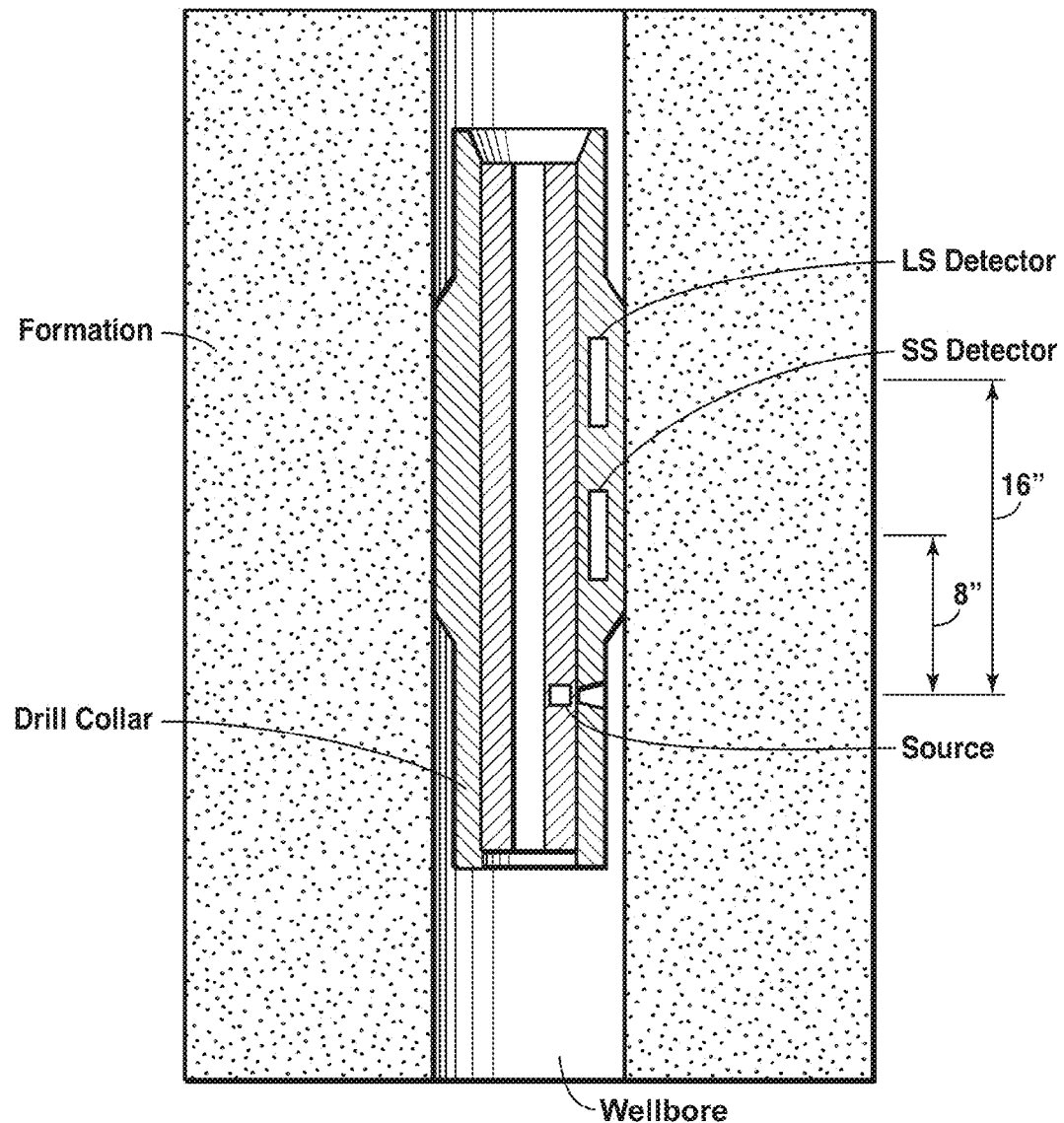
FIG. 4 is a schematic diagram illustrating a typical logging-while-drilling (LWD) density tool which is mounted on the drill collar above the bottom-hole-assembly (BHA not shown); the distances are measured between centers of the gamma ray source and the detectors and are typical values for existing technology.

The invention will be described in connection with example embodiments. To the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

A method and apparatus are disclosed using nuclear density logs to evaluate cement density and thickness in a wellbore completed with casing and cement. A key feature of the invention is that the logging tool configurations have much smaller than typical spacing between gamma ray source and detectors, in order to optimize the measurement sensitivity to cement properties as shown in FIGS. 5A-5B and 7A-7B. The first detector, which is the closest to the source, has a depth of investigation of preferably less than two inches and is mostly sensitive to the steel casing. The second detector, which is located several inches beyond the first detector, has a slightly larger sensitive volume encompassing the casing and cement, but primarily the cement. The third detector has a larger-still volume of investigation covering the casing, the cement, and extending into the formation region. Compared with existing density logging technology, the new logging tool is approximately 50% smaller in source-detector dimensions and the volume of investigation is the near-wellbore region. This principle is illustrated in FIG. 8.

A second key feature of the present invention is that it scans all azimuth angles, providing azimuth-dependent density (count rate) data. The new nuclear density tool can be built either on a single pad-mounted a rotating device to scan the wellbore circumferentially (FIGS. 5A-5B), or on multiple pads/arms (four, six, or more) while being lowered into or pulled out of a wellbore (FIGS. 7A-7B). Gamma ray source and detectors are typically used in nuclear density tools. Other types of nuclear sources and detectors, such as neutron particles and neutron or gamma ray detectors may also be used. A directional survey module built within the tool body or attached on the same tool string may be used to record the tool face orientation data.

The gamma ray detectors record gamma ray count rates as a function of azimuthal bins or sectors at each logging depth. Ideally, the detectors are housed in a cylindrical tool housing made of shielding materials such as tungsten. If the entire tool housing cannot be made of shielding material due to mechanical strength requirements, it should be designed such that the detectors are surrounded with shielding materials to prevent detection of undesirable radiation influences. The collimation is achieved by carving out windows in front of detectors and filling the windows with materials of low atomic numbers such as beryllium to achieve a pressure seal in the tool body. Tool integrity is an important aspect in tool design so that a logging tool remains functional in hostile downhole conditions at elevated pressure and temperature. These window openings can be designed with various azimuthal apertures depending upon the azimuthal resolution. A window with small azimuthal aperture has a higher azimuthal resolution than a large azimuthal window. Commercial density logging tools typically have 45-deg azimuthal windows. The window apertures on the cement image density tool should not be more than 10-15 degrees.

The cement density image tool with a single pad mounted on a rotating chassis has advantages over the multiple-pad tool in that it is simple to build and provides a continuous image around the wellbore. It constantly rotates and acquires count rate data while being pulled out of or lowered in the wellbore. The count rates are then binned into azimuthal sectors at each logging depth. The number of angular sectors can be 16, or 32, or even more to provide high resolution image data. The logging speed or the cable velocity is controlled so as not to compromise the vertical resolution. For example, a 600 ft/hour logging speed with 20 rpm (revolutions per minute) of scanning speed allows acquisition of image data with 6 in vertical resolution.

A nuclear density interpretation algorithm is built to carry out mathematical inversions using detector count rates and calculate casing and cement density and thickness distributions azimuthally. This interpretation algorithm can be constructed using similar physics and computational principles as are used for existing gamma ray tools that are optimized to give the formation density.

A cement density image around the wellbore is obtained in this manner. With known well completion information such as casing size and weight as well as cementing job information indicating cement slurry type and weight, and open hole caliper data, the number of unknowns in the interpretation algorithm can be reduced such that the cement density image provides a cement quality map indicating potential presence of fluid contaminations and/or fluid-filled channels in cement sheath between casing and formation. Together with traditional cement bond logs, cement density image logs can significantly reduce the uncertainty of cement bond interpretation.

Figure 5A:
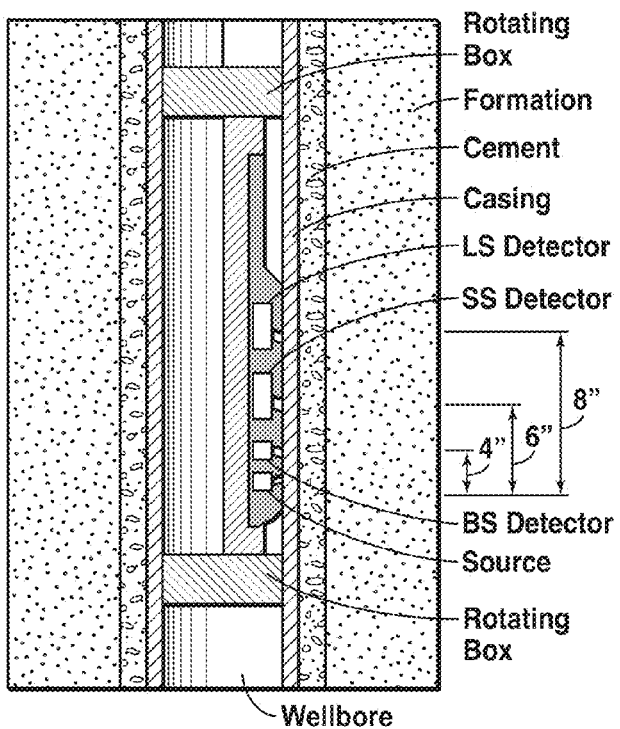
FIG. 5A is a schematic diagram illustrating a wireline cement density tool design with a rotational tool body, according to one embodiment of the present invention.
Figure 5B:
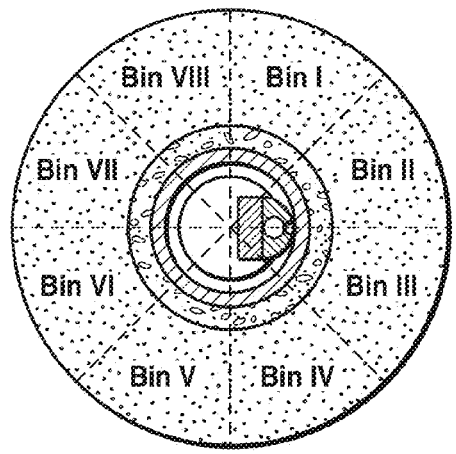
FIG. 5B shows the cross-sectional view; the distances are measured between centers of the gamma ray source and the detectors.
Figure 6:
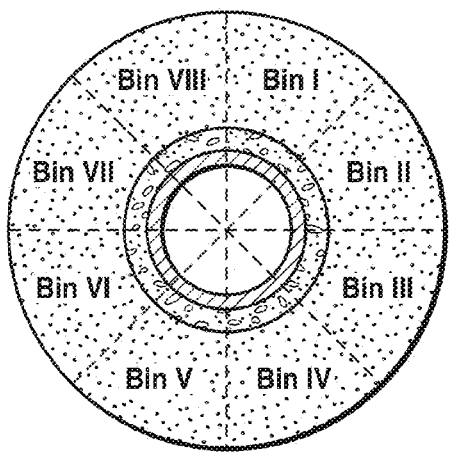
FIG. 6 shows a cross-section of a borehole conceptually divided into eight equal azimuthal angle bins for collecting cement density image data in one embodiment of the present inventive method.

One embodiment of this invention involves a wireline tool design with a rotational tool body capable of providing circumferential cement density image around a wellbore. FIGS. 5A and 5B are conceptual drawings of a side view and a cross-section view of a wireline cement density image tool. As shown in FIG. 6 the azimuthal cement density image data are acquired in angular bins around the wellbore. The number of angular bins can be optimized to produce cement density images with desired resolution.

An alternative embodiment of this invention involves a wireline tool design with multiple measurement pads mounted on a stationary tool body for circumferential density measurement within a wellbore. FIGS. 7A and 7B show two views of a conceptual drawing of a wireline cement density image tool with four measurement pads. Each pad performs an individual cement density measurement. A single gamma ray source is located within the lower part of the tool body. The tool housing is made of gamma ray concept plays a role material such as tungsten with collimation windows surrounding the source to provide focused paths for gamma rays to travel to each individual pad, and thus discriminating against gamma rays originating in other bins. The window "openings" in the tool body are filled with light weight and low atomic number material such as beryllium in order to achieve a pressure seal in the tool body. Tool integrity is an important aspect in tool design so that a logging tool remains functional in hostile downhole conditions at elevated pressure and temperature. The low atomic number material has a low cross-section for attenuating or scattering gamma rays The number of pad and window pairs can be four, six, eight or more depending upon the desired image resolution.

The collimators and windows can be seen in FIGS. 5A-5B as well as in FIGS. 7A-7B. From the side views (5A and 7A), it can be seen that the collimators are directed at different polar angles for the LS, SS, and BS detectors (downward). The reason for this is to control the volume of investigation (as well as the azimuth sector) for each detector as illustrated in FIG. 8. The cross-section views of FIGS. 5B and 7B indicate how the collimators focus each detector on the straight-ahead azimuthal angle bin and tend to shield the detector from gamma radiation originating from other azimuthal bins.

Another aspect of the invention involves an interpretation algorithm 93 to derive cement density from gamma ray count rate. The algorithm can be built using either tool characterization data acquired in standard rock formations in laboratories or computing modeling data, or a combination of both types of data. Methods are known for doing this, and they do not vary in principle from the methods used in the interpretation algorithms in existing gamma ray density tools.

The primary input of the algorithm is gamma ray energy spectra which are detector count rates acquired as a function of gamma ray energy. A typical commercial gamma source, Cs-137, may emit as many as 7.4×1010 gammas per second with a half-life of 30 years. Other gamma sources may have different intensities and half-lives. The spectral count rates are recorded and sorted azimuthally in angular bins at each logging depth. Well completion information and cementing job information such as borehole caliper, casing size and weight, cement slurry weight, are also needed to achieve an optimal solution. A general embodiment of the interpretation workflow is illustrated in the flow chart of FIG. 9.

Figure 9:
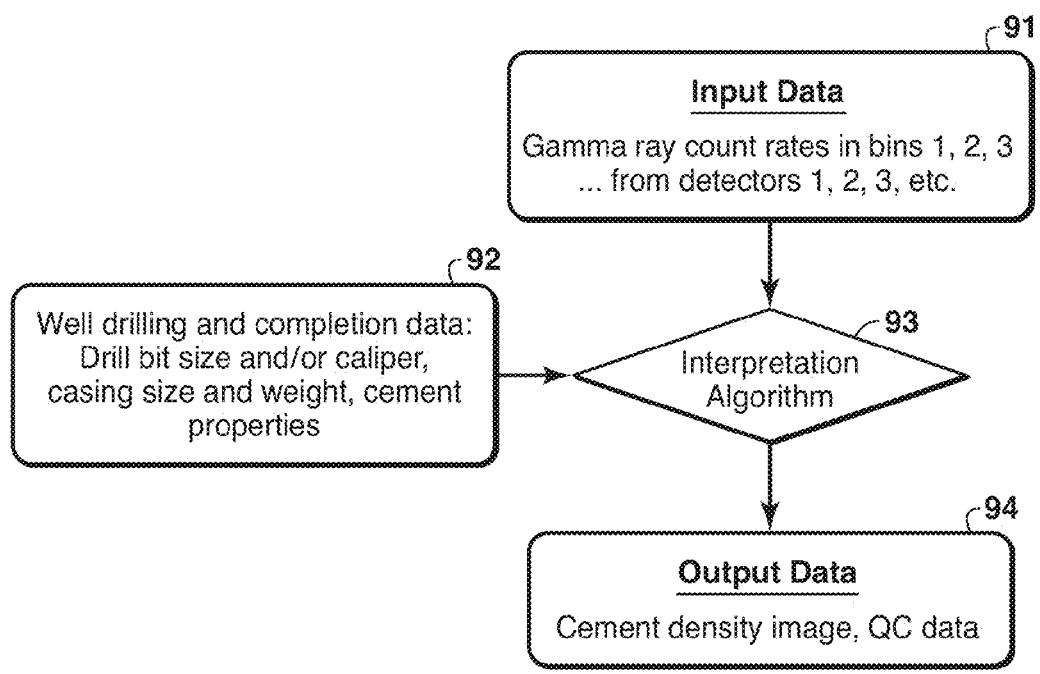
FIG. 9 is a flow chart showing basic steps in one embodiment of the present inventive method.

A more specific embodiment of the method of FIG. 9 may be described as follows, using a three detector configuration, although the tool design can have more than three detectors. If there are n detectors, that means there are n independent measurements. There are preferably at least as many independent measurements as there are unknown parameters in the interpretation algorithm.

Step 1: Density measurements in kth azimuthal bin are obtained using individual detector calibration functions. These are also called apparent density measurements.

From detector 1: $\rho_{1k} = a_1 \ln(C_{1k}) + b_1$

From detector 2: $\rho_{2k} = a_2 \ln(C_{2k}) + b_2$

From detector 3: $\rho_{3k} = a_3 \ln(C_{3k}) + b_3$ where the $a_i$ and $b_i$ are detector specific count rate-to-density calibration coefficients, and k=1 . . . K where K is the total number of azimuthal bins (4, 8 or 16, etc.).

Step 2: The apparent density from each detector is a function of casing density and thickness, cement density and thickness, and formation rock density as shown in FIG. 8. These apparent densities form a system of equations with multiple unknown parameters.

$\rho_{1k} = f_1(\rho_{casing}, h_{casing}, \rho_{cement}, h_{cement}, \rho_{formation})$ $\rho_{2k} = f_2(\rho_{casing}, h_{casing}, \rho_{cement}, h_{cement}, \rho_{formation})$ $\rho_{3k} = f_3(\rho_{casing}, h_{casing}, \rho_{cement}, h_{cement}, \rho_{formation})$ Step 3: Several of the parameters in these equations are known. For instance, casing density and thickness are determined by casing weights for a specific casing size in a casing specs table. Formation density is known if an open hole density log is run. The remaining unknowns in the system of equations in step 2 are cement density $\rho_{cement}$; cement thickness $h_{cement}$; and formation density $\rho_{formation}$ which can be easily solved with mathematical inversion methods in which theoretically predicted (using initial models for the inversion unknowns) count rates are compared to the measured count rates, the models for the inversion unknowns are adjusted to reduce the misfit, and the process is repeated until a predetermined convergence criterion is satisfied or other stopping condition is met.

In summary, key features of the present invention include a tool design with shortened source-to-detector distances to maximize the measurement sensitivity to cement properties, an interpretation method to solve for cement density and thickness, and a scanning mechanism to provide azimuthal sensitivity. Existing density tools have larger distances between source and detectors, which makes them unsuitable for analyzing cement in a cased well.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for generating a cement density image in a cemented borehole, comprising:
   positioning a logging tool inside the borehole at a selected depth, wherein the logging tool comprises a gamma ray source, a short-spaced detector positioned ≤7 inches from the source, and a long-spaced detector positioned less than 12 inches but farther than the short-spaced detector from the source; and
   measuring gamma ray count rates at each detector and using them to calculate an estimated cement thickness or density.

2. The method of claim 1, wherein the short-spaced detector is positioned 6±1 inches from the source and the long-spaced detector is positioned 8±1 inches from the source.

3. The method of claim 1, wherein a series of count rates are measured at each detector, each count rate, representing a different azimuthal sector.

4. The method of claim 3, wherein each detector comprises a collimated window surrounded by gamma shielding material.

5. The method of claim 3, wherein azimuthal count rates are achieved using a rotational tool body.

6. The method of claim 3, wherein azimuthal count rates are achieved with multiple measurement pads, each said pad contacting the casing at a different azimuth angle, and each pad containing at least one set of detectors, each set including a short-spaced detector and a long-spaced detector.

7. The method of claim 3, wherein a cement thickness or density image as a function of azimuth angle is generated.

8. The method of claim 1, wherein the cement is an annular region distally bounded by a subsurface formation and proximally bounded by a metal casing.

9. The method of claim 8, wherein spacing from the source to the short-spaced detector and the long-spaced detector is determined at least partly by thickness of the cement annular region and radial distance of the cement annular region from borehole axis.

10. The method of claim 9, further comprising a backscatter detector positioned closer to the source than the short-spaced detector by an amount determined at least partly by thickness of the casing.

11. The method of claim 1, wherein the calculation of estimated cement density or thickness comprises:
   (a) developing mathematical expressions relating apparent density of an investigation domain to count rate for each detector;
   (b) developing other mathematical functions expressing apparent density as a function of unknowns comprising casing density and thickness, cement density and thickness, and formation rock density;
   (c) combining the expressions and functions from (a) and (b) resulting in relationships that predict, rate, and each detector as a function of the unknowns in (b); and (d) inverting the measured gamma ray count rates to infer at least cement density or thickness, using an iterative, numerical optimization technique.

12. The method of claim 11, wherein the number of inversion unknowns is reduced by determining casing density and thickness from known casing specifications, and obtaining formation rock density if an open hole density log was run, leaving fewer unknowns comprising cement density and cement thickness.

13. A nuclear density logging tool for cemented borehole use, for estimating cement density or thickness, comprising:
a tool body adapted to be lowered longitudinally into a casing in a cylindrical borehole along the borehole axis, said tool body housing a gamma ray source, a short-spaced detector and a long-spaced detector, all fixed to the tool body and spaced in the longitudinal direction such that the short-spaced detector is positioned $\leq 7$ inches from the source and the long-spaced detector is positioned less than 12 inches from the source but farther than the short-spaced detector.

14. The logging tool of claim 13, wherein the short-spaced detector is positioned $6\pm1$ inches from the source and the long-spaced detector is positioned $8\pm1$ inches from the source.

15. The logging tool of claim 13, wherein each detector comprises a collimated window surrounded by gamma shielding material.

16. The logging tool of claim 15, wherein the tool body is adapted to rotate to different azimuth angles.

17. The logging tool of claim 15, wherein the tool body comprises a plurality of measurement pads, each pad adapted to contact a well casing at a different azimuth angle, and each pad containing at least one set of detectors, each set including a short-spaced detector and a long-spaced detector.

18. The logging tool of claim 17, wherein each pad is designed to articulate so as to contact well casings of different sizes.

19. The logging tool of claim 13, wherein spacings from the source to the short-spaced detector and to the long-spaced detector is determined at least partly by thickness of a cement annular region and radial distance of the cement annular region from a borehole axis.

20. The logging tool of claim 13, further comprising a backscatter detector positioned closer to the source than the short-spaced detector by an amount determined at least partly by the casing's thickness.

21. The logging tool of claim 20, wherein the backscatter detector is located within 5 inches of the source.

22. The logging tool of claim 21, wherein the backscatter detector is located $4\pm1$ inches from the source.

* * * * *